INVENTORS
JAMES J. NEVILLE
HENRY F. MILLER
THOMAS J. RHODES
BY Charles A. Blank
ATTORNEY

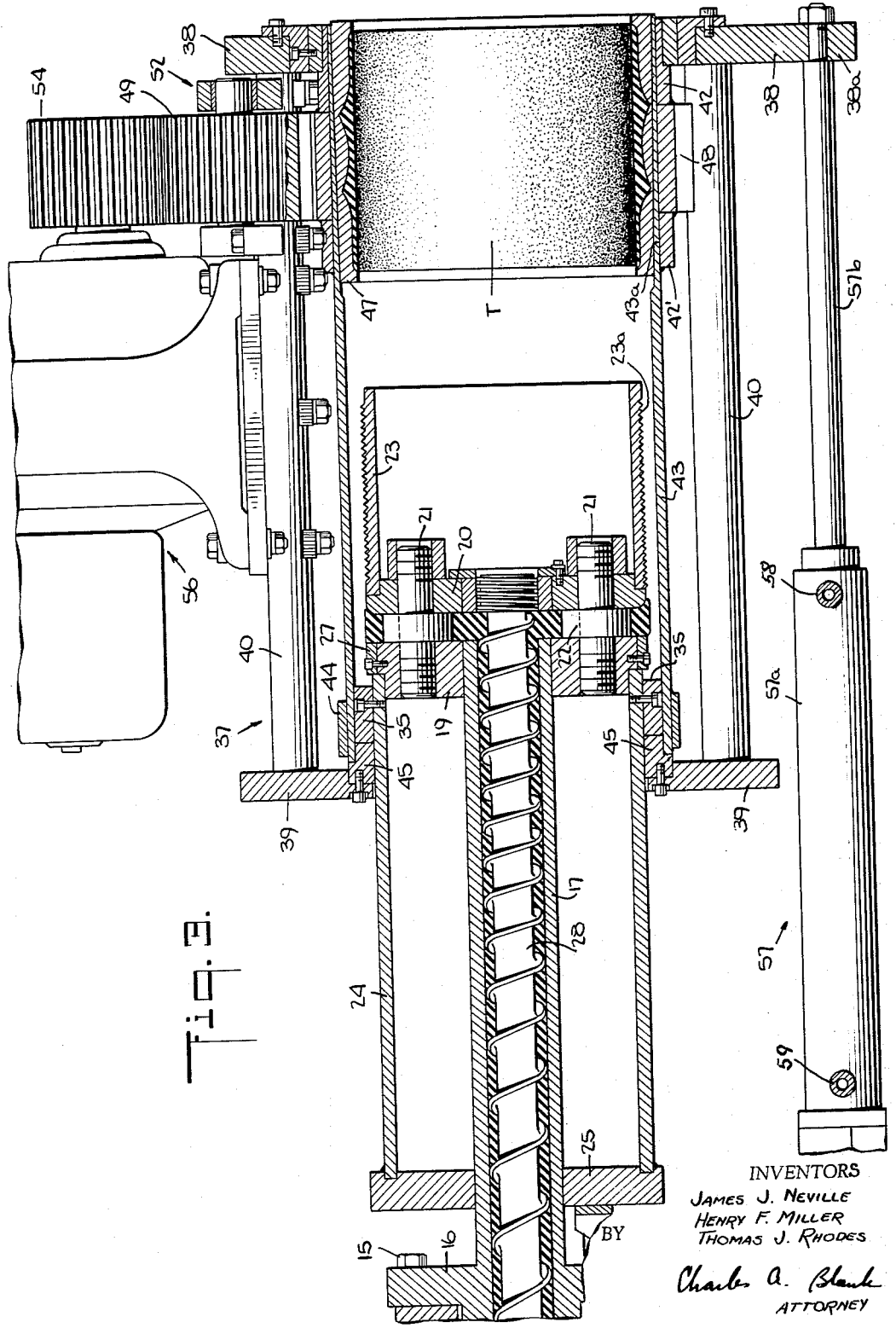

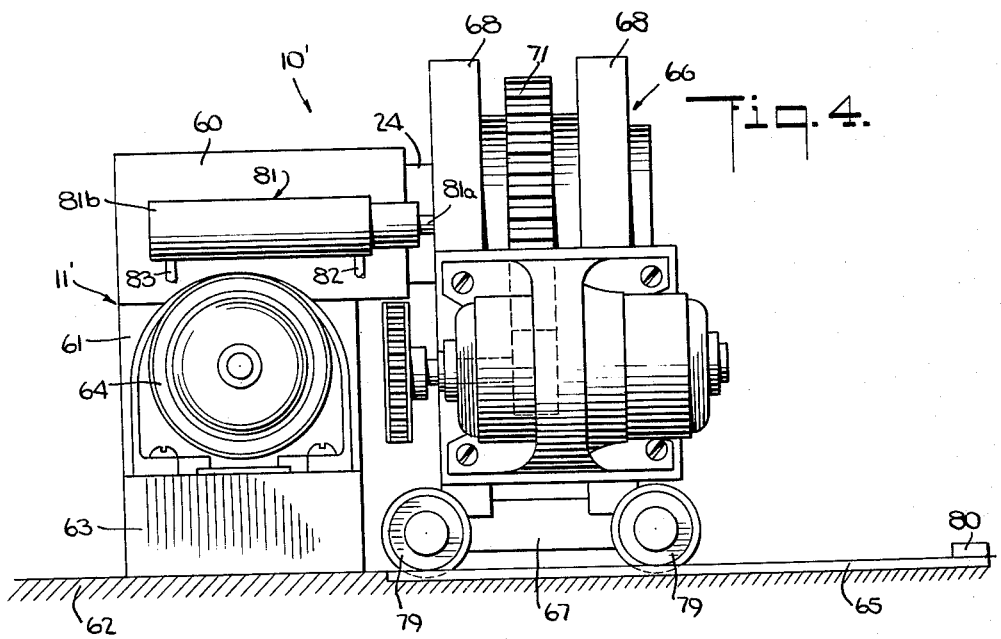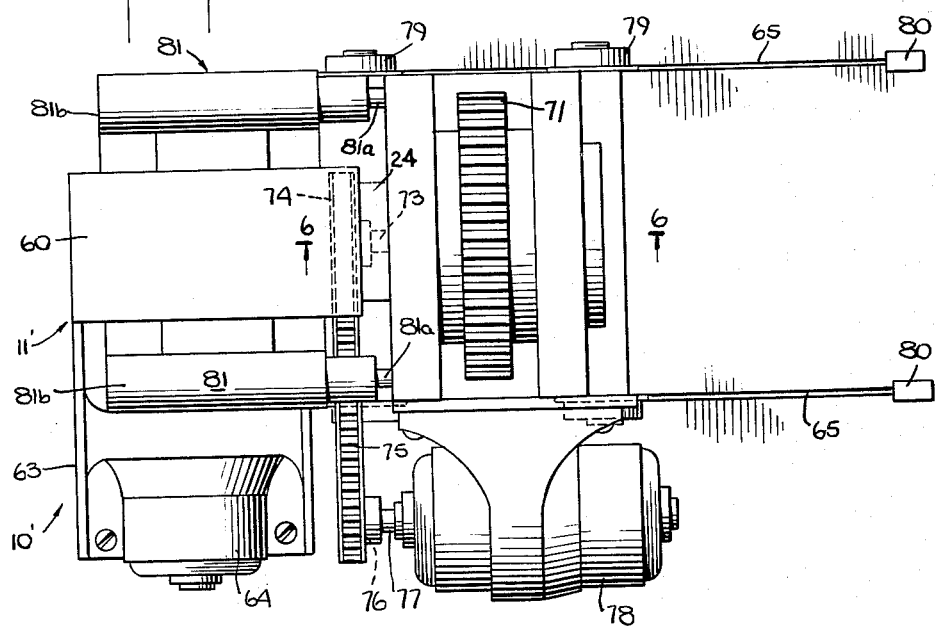

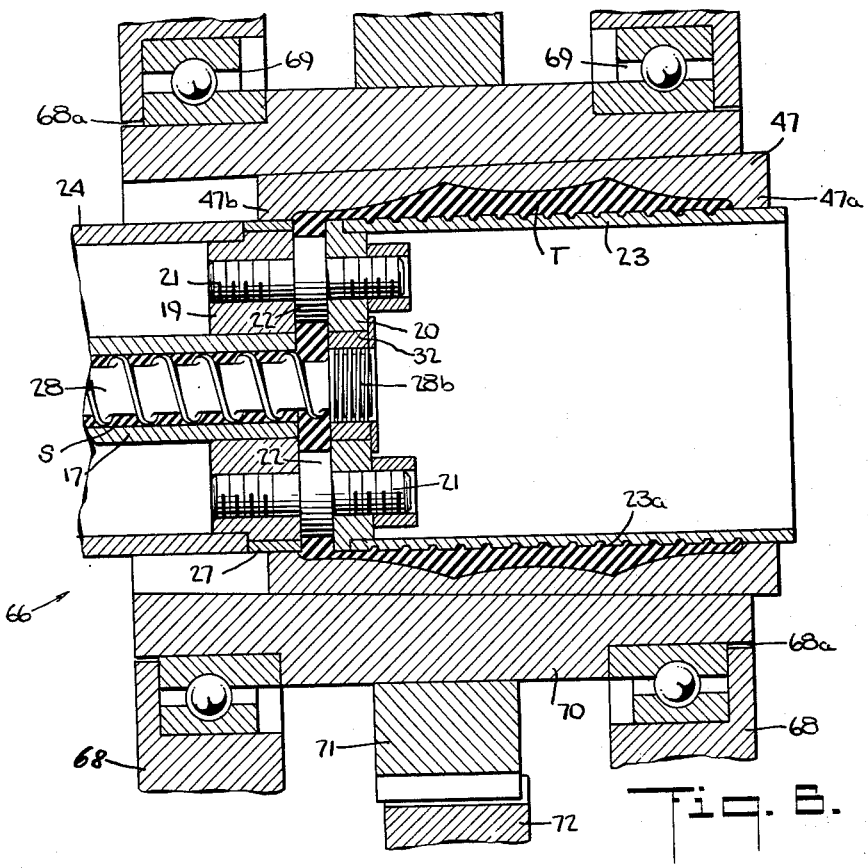
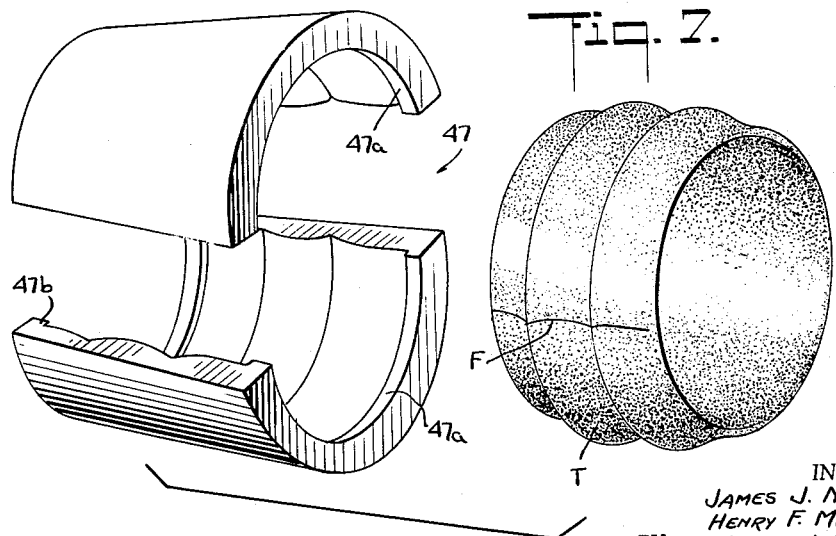

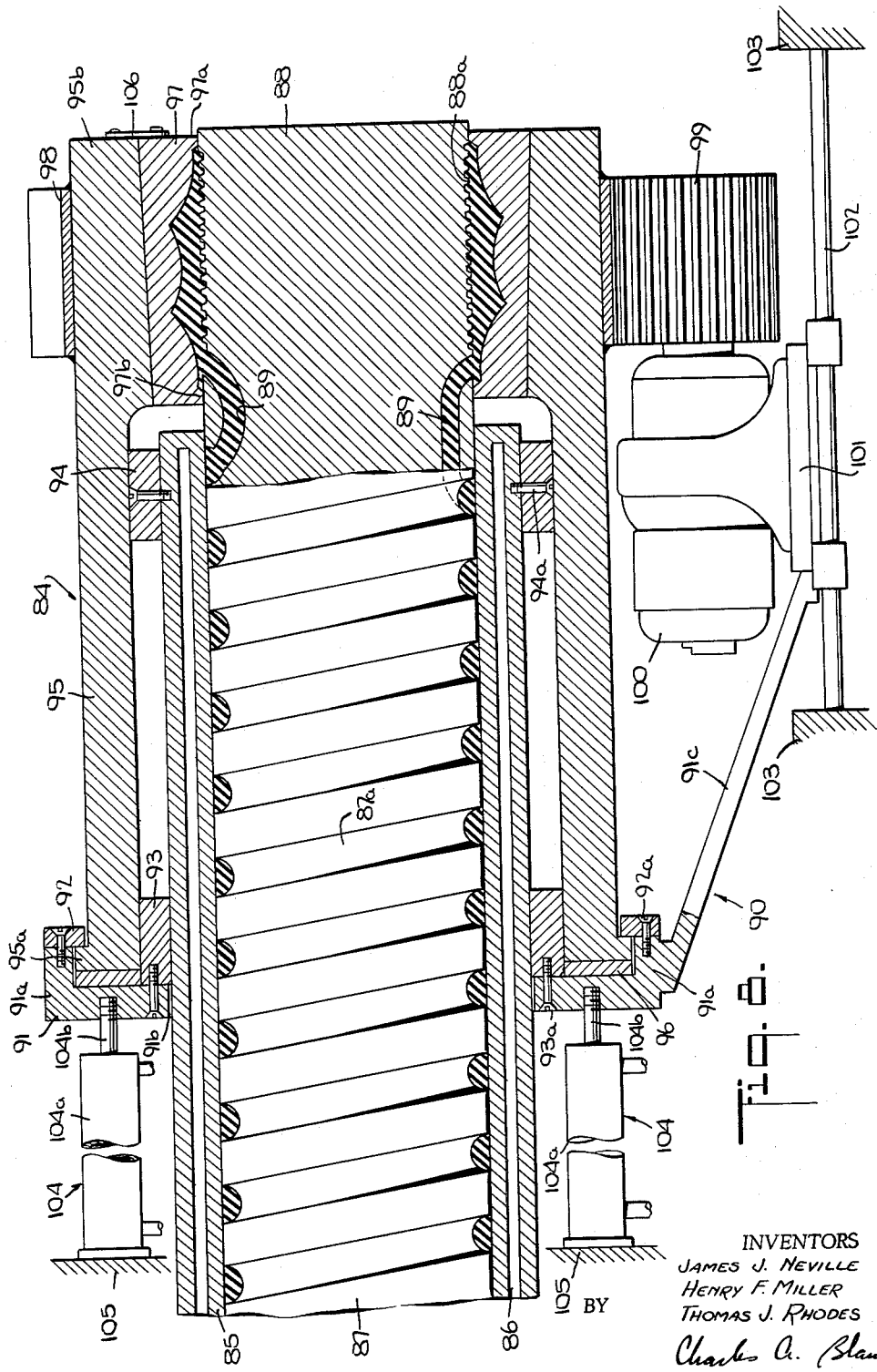

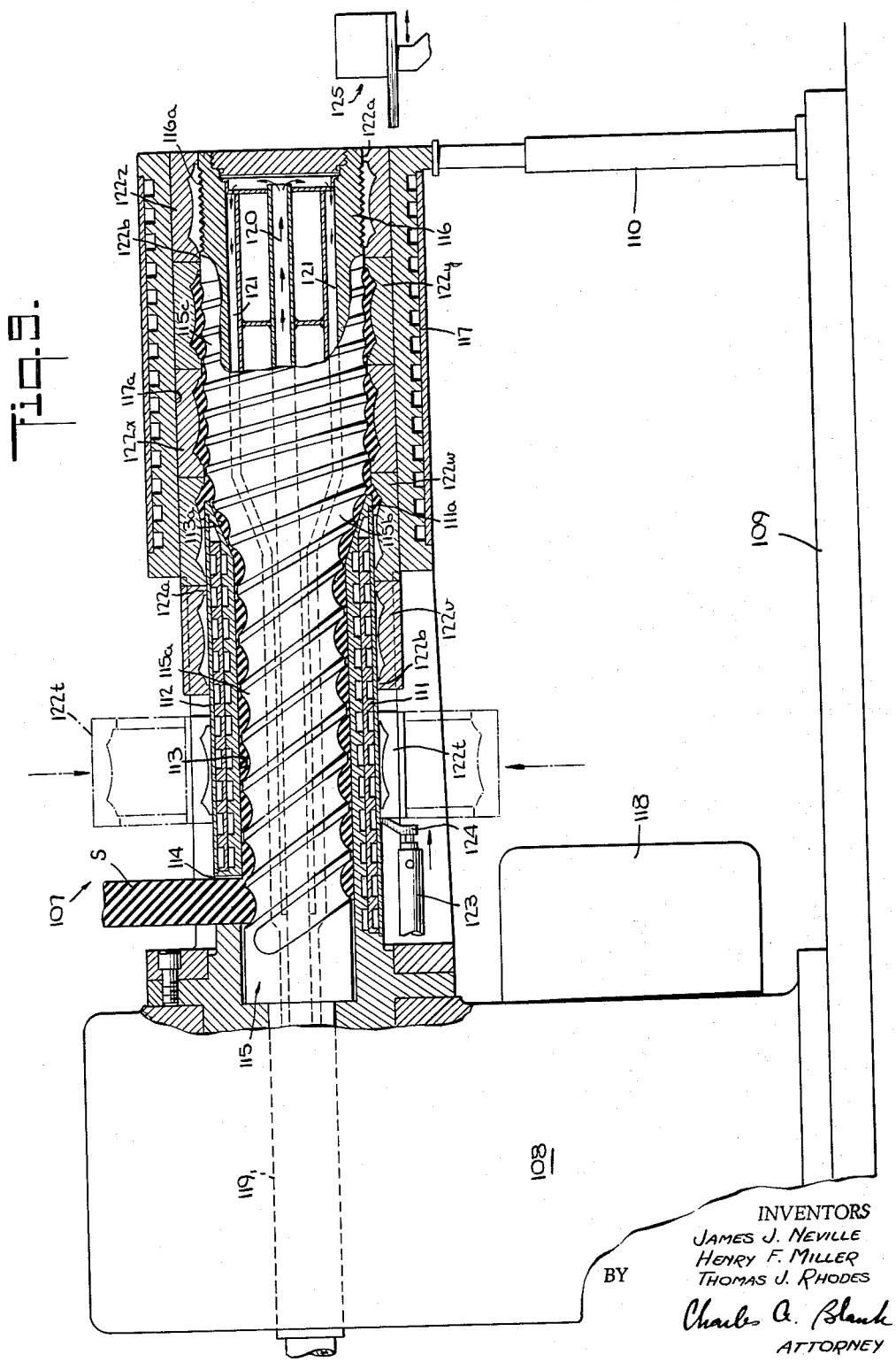

3,259,682
PROCESSES OF AND APPARATUS FOR PRODUCING SEAMLESS ANNULAR BODIES
James J. Neville, Smoke Rise, Kinnelon, Henry F. Miller, Clifton, and Thomas J. Rhodes, Smoke Rise, Kinnelon, N.J., assignors to United States Rubber Company, New York, N.Y., a corporation of New Jersey
Filed Nov. 2, 1962, Ser. No. 235,054
8 Claims. (Cl. 264—312)

This invention relates to processes of and apparatus for producing from plastic materials annular bodies having substantially cylindrical inner surfaces.

Although the invention is of broad and general utility, being applicable to the formation of any type of annular body having a cylindrical inner surface, it will be described hereinafter with specific reference to the production of annular tire tread bands having a cylindrical inner surface and an essentially irregular outer surface.

Tire treads in current practice are formed by extruding rubber or like elastomers (suitably admixed with desired vulcanizing ingredients) into slab form. The slabs are then cut into strips of predetermined length so that each may be applied circumferentially to the exterior periphery of a multi-ply rubberized fabric cord carcass on a tire building drum of conventional construction, the tread being completed on the carcass by a splice at the abutting ends of the strip. Each completely built-up tire band, consisting of carcass, sidewall strips and tread strip, then is placed into a tire press where it is shaped, molded and cured under heat and pressure to final form.

It has been found, however, that the production of treads from slabs of rubber stock entails a number of drawbacks and disadvantages.

a. Slab tread stock, which emerges from the extrusion die at a relatively elevated temperature, has a tendency to shrink irregularly upon cooling. For obvious reasons, therefore, application of the tread strip, while hot, to the carcass and subsequent cooling of the tread stock on the carcass itself cannot be permitted. As a consequence, the use of slab tread stock requires tire manufacturers to provide storage spaces for individual slabs so as to permit the same to cool prior to being used in the entire building operations. This, of course, necessitates a huge investment of money, labor and materials, since not only must a considerable quantity of the slab tread stock always be lying idle, but special storage racks must be provided wherein the individual lengths of slab are kept separate and apart to prevent their adhering to each other.

b. A further consequence of the irregular shrinking characteristics of slab tread stock is that, since the slabs are generally cut to size before they have reached their stable ultimate dimensions, the tire builder must frequently expend additional time and labor in accommodating the lengths of the slabs to the circumferences of the respective carcasses.

c. Since extrusion of tread stock in slab or strip form requires relatively high extrusion pressures which, by causing the stock to be subjected to large shear stresses, lead to a considerable temperature rise in the stock during the extrusion, extreme care must be taken not to accelerate the tread stock too much. This in turn correspondingly increases the time interval during which the stock must be subjected to vulcanizing temperatures and thus reduces the number of finished tires which can be produced per unit of time.

d. In any tire wherein the tread stock is applied to the carcass in slab or strip form, the opposite ends of the strip or slab must be joined to one another by a transverse splice, i.e. a butt joint of the angularly cut ends of the slab. Tires so constructed may have a relatively high thump level, and although thump is not exclusively a function of the presence of the splice, it is at least partly attributable to this characteristic of the tread. Moreover, the strength of the finished tread may be less than is desired in the vicinity of the splice.

e. It is generally found that a large percentage of tires constructed by means of conventional methods employing slab tread stock have air entrapped between the carcass and the tread. Such air, of course, tends to interfere with the bonding or knitting of the tread to the carcass during the tire molding operation and thus leads to defective tires.

Attempts have been made heretofore to eliminate these drawbacks and disadvantages by extruding tire treads in annular form, with the intention that the sleeve-like tread band could be fitted axially over and thus applied directly onto the fabric cord carcass without the necessity of forming a splice in the tread. In accordance with one of such known procedures, the tread stock is extruded radially into a mold cavity having the cross-sectional shape of a tread and defined between a stationary cylindrical drum and a surrounding hollow cylindrical sleeve which is adapted to be rotated relative to the drum. The drum is provided with a radial slot-like extrusion orifice through which the stock enters the mold cavity, as well as with means for lubricating the drum surface to facilitate movement of the stock through the mold cavity. Although the resultant tread is in the form of an annular band, it does not avoid all of the defects of the slab tread noted hereinbefore. Principally this is due to the fact that since the extruded stock travels through the mold cavity circumferentially about the drum, when the leading end of the mass of tread stock moving through the cavity returns to the location of the extrusion orifice, it perforce forms a butt joint or splice with the material then being extruded into the cavity. The pressure necessary to force the final increment of rubber into the mold necessarily being greater than that which pervades during the balance of the filling cycle, an axial discontinuity is likely to appear in treads molded in this fashion.

Still another attempt which has been made to produce a spliceless tread involves extruding the tread stock into a mold cavity defined between an outer sleeve-like mold member and an inner cooperating core. The arrangement is such that the extruded stock is divided into the form of a sleeve which enters the mold cavity at one end and is advanced through the latter by the pressure of the following stock, the sleeve at all times extending entirely around the core. Both the core and the outer mold member are kept stationary during the extrusion operation, and after the same is finished the core is withdrawn axially, leaving the annular tread in the outer mold member. For the purpose of extracting the tread from the cavity, a tire carcass mounted on an expansible mandrel is then inserted into the mold cavity and expanded to bring the carcass into contact with the inner surface of the tread under pressure so as to knit or stitch the tread to the carcass, whereupon collapsing of the latter causes the tread to be drawn away from the inner surface of the outer mold member and permits its extraction from the latter.

This procedure also has failed to gain any appreciable acceptance in the tire manufacturing art by virtue of the fact that it is extremely difficult to form high quality finished tread bands thereby, especially in sizes suitable for use on automobile and truck tires. Although the reason for this is not entirely clear, it may be surmised that it is due to the original propelling of the sleeve of extruded rubber linearly and parallel to the axis of the mold cavity over the stationary opposed mold surfaces and the subsequent linearly axial pulling of the core out of the confines of the cavity over the inner surface of the annular tread band. It appears clear that the movement of the sleeve through the relatively narrow mold cavity depends solely on the extrusion pressures employed in forcing the stock into the cavity. Since the resistance to the stock movement is very high, the temperature of the stock tends to rise to an undesired level. Moreover, the subsequent extraction of the core tends, due to the cohesion between the stock and the core, to distort the formed tread band.

It is, therefore, an important object of the present invention to provide processes of and apparatus for producing annular, spliceless tire tread bands in a manner which avoids the disadvantages and drawbacks of heretofore known tread forming apparatus and procedures.

More particularly it is an object of the present invention to provide such processes and apparatus characterized by the fact that the rubber tread stock is extruded axially into the annular mold cavity and, while advancing through the cavity axially of the latter, is also caused to spiral about the axis of the mold cavity.

A related object of the present invention is the provision of such processes and apparatus characterized by the fact that both during extrusion of the tread stock into the mold cavity and the separation of the finished band from the inner mold member the relative motion between the outer surface of said inner mold member and the rubber contacting the same is helical in nature coaxially with the mold cavity.

Still another object of the present invention, therefore, is the provision of means which enable the finished annular and spliceless tread bands to be produced without lubrication of the mold surfaces while avoiding the exertion of excessive shear stresses on the rubber stock.

It is also an object of the present invention to provide means, for tread forming processes and apparatus as aforesaid, which are operable to separate the outer mold member from the inner mold member automatically upon completion of the band formation without any interruption in the state of relative rotation between the rubber and the inner mold member.

A further object of the present invention is the provision of such processes and apparatus which improve tread forming operations in such a manner that overall tire production capacities can be greatly increased concomitantly with the attainment of substantial economies in the production of the tires.

The foregoing and other objects, characteristics and advantages of the present invention will be more fully understood from the following detailed description of preferred embodiments thereof, which description is to be read in conjunction with the accompanying drawings, wherein:

FIG. 3 is a sectional view similar to FIG. 1 and illustrates the apparatus during the removal of the finished tread band from the inner mold member;

FIG. 4 is a side elevational view, on a somewhat reduced scale, of a modified construction of the apparatus shown in FIG. 1;

FIG. 5 is a top plan view of the structure shown in FIG. 4;

FIG. 6 is a sectional view taken along the line 6—6 in FIG. 5;

FIG. 7 is an exploded view of a split outer mold member and an annular tread band formed therein in accordance with the principles of the present invention;

FIG. 8 is a fragmentary, longitudinal, vertical section through a tread band forming apparatus according to another embodiment of the present invention; and FIG. 9 is a fragmentary, longitudinal, vertical section through a tread band forming apparatus according to still another embodiment of the present invention.

Figure 1:
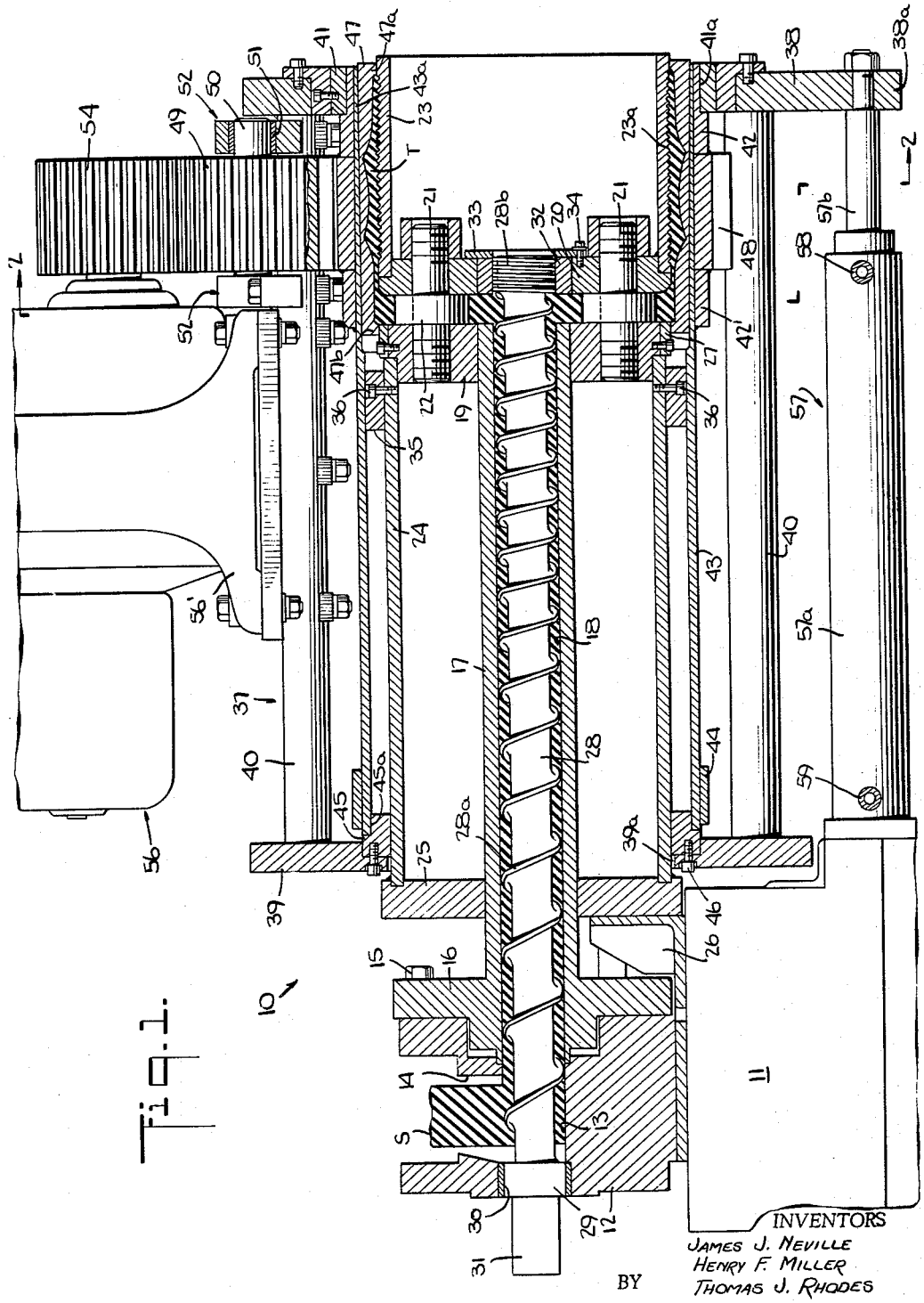
FIG. 1 is a fragmentary, longitudinal, vertical section through a tread band forming apparatus constructed in accordance with one embodiment of the present invention and illustrates the same at the conclusion of the extrusion operation.
Figure 2:
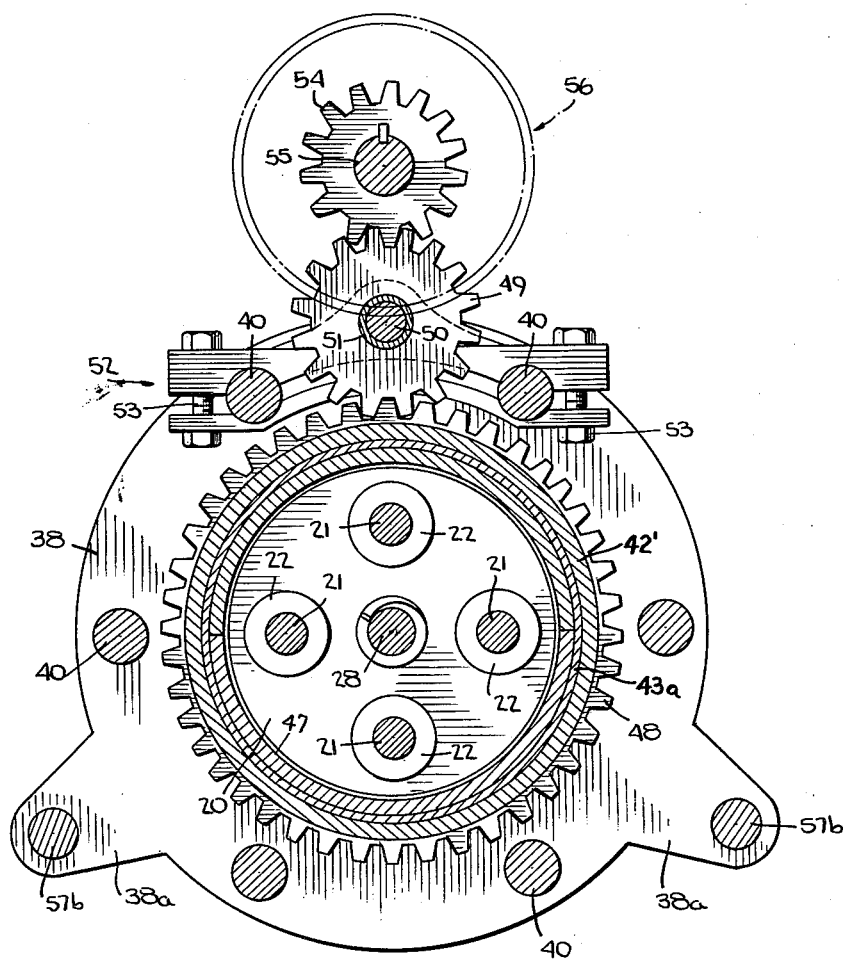
FIG. 2 is a sectional view taken along the line 2—2 in FIG. 1.

Referring now more particularly to FIGS. 1, 2 and 3, it will be seen that the apparatus 10 for forming annular, spliceles treads for pneumatic tires comprises, according to one aspect of the present invention, a rigid base structure 11 atop which is mounted a block 12 provided with a horizontal bore 13 and in its top with a substantially vertical opening 14 communicating with the bore 13 so as to permit the tread stock S to be introduced into the bore. Rigidly secured to the block 12 by means of bolts 15 is a flange 16 of an elongated cylindrical barrel 17 which extends frontwardly from the block 12 and has a central bore 18 axially aligned with the bore 13 in the block 12. The front end of the barrel 17 is received in the central aperture of a rigid annular plate 19 to which another rigid annular plate 20 is secured by means of a plurality of high-strength bolts 21. The plates 19 and 20 are maintained at a suitable spacing from each other by means of spacers 22 surrounding the shanks of the bolts 21, respectively.

Welded to the plate 20 and extending frontwardly therefrom is an annular sleeve-like member 23 which has a substantially cylindrical outer surface provided over the entire length thereof with relatively shallow screw flights 23a. The plate 19 is likewise welded to a rigid cylindrical sleeve 24 which extends rearwardly from the plate 19 in surrounding relationship to the barrel 17 and is welded at its rearwardmost end to an annular plate 25 fitted over the barrel 17 and secured in any suitable manner (not shown) to a member 26 rigidly mounted on the base structure 11. The plate 19 further supports a ring 27 made of a highly wear-resistant material which is bolted to the outer periphery of the plate. The ring 27 is axially aligned with and has the same external diameter as the plate 20 and the member 23 secured to the latter, for a purpose which will be more clearly understood as the description proceeds. Thus, the barrel 17, the plates 19 and 20, the member 23 and the sleeve 24 together constitute a rigid structure which is at all times stationary on and relative to the base structure 11.

Rotatably disposed within and extending entirely through the bores 13–18 is an extrusion screw 28 which at its rearwardmost end 29 extends through a seal 30 and has its shaft extension 31 connected via a thrust bearing (not shown) to any suitable motor (not shown). The pitch of the helical rib 28a of the screw decreases gradually toward the front end of the latter. The screw 28 extends beyond the plate 19 through the space between the plates 19 and 20 and has the front end of its shaft provided with closely packed screw flights 28b which are pitched oppositely to the helical rib 28a. The end of the screw bearing the flights 28b is received with a close sliding fit in a bushing 32 mounted in the central opening of the plate 20 and held therein by means of a guard plate 33 bolted to the plate 20, as shown at 34, and provided with a central opening disposed coaxially with the bore in the bushing 32 and the bore 18 of the extrusion barrel 17. The arrangement is such that the stock S fed into the bore 13 through the opening 14 is advanced through the bore 18 by the screw 28 while being compressed to a certain degree by the progressively closer spacing of the feed screw flights 28a as the stock approaches the space between the plates 19 and 20. The screw flights 28b function as dynamic sealing means which prevent any escape of the compound to the interior of the member 23.

The sleeve 24, which has a bearing ring 35 secured to its outer periphery adjacent its forwardmost end by bolts 36, serves as means for supporting a rigid cage structure 37 for reciprocal linear movement toward and away from the base structure 11 and in particular back and forth over and along the cylindrical member 23. The said cage structure comprises a pair of vertical end plates 38 and 39 which are interconnected by rigid tie rods 40. The front end plate 38 carries a bearing ring 41 which defines a central opening 41a that rotatably accommodates a shouldered annular member 42 mounted on the outer periphery of the front end portion 43a of an elongated sleeve 43 disposed in concentric and surrounding relationship to the sleeve 24 and the cylindrical member 23. The inner diameter of the sleeve 43 over the major portion thereof is substantially equal to the outer diameter of the bearing ring 35 so as to enable the sleeve to slide smoothly over the said bearing ring.

At its rearwardmost end the sleeve 43, suitably strengthened by a surrounding reinforcing ring 44 welded to the outer periphery of the sleeve, is telescoped over a shouldered portion 45a of another bearing ring 45 which is slidably mounted on and about the stationary sleeve 24. As clearly shown in FIGS. 1 and 3, the outer diameter of the shouldered portion 45a is precisely equal to the outer diameter of the bearing ring 35. The slidable ring 45 is secured by bolts 46 to the inner border of the end plate 39 which has a central opening 39a provided therein. The diameter of this opening is somewhat larger than the outer diameter of the sleeve 24 so as to enable the plate 39 to move freely over the said sleeve.

As further clearly shown in FIGS. 1 and 3, the major portion of the sleeve 43 is of substantially uniform wall thickness and has a cylindrical inner surface. The wall thickness of the front portion 43a is somewhat smaller, however, and actually decreases in the direction of the front end of the sleeve. For the purposes of the present invention, as will be more fully explained presently, it is preferred that the wall thickness of the sleeve portion 43a taper to the extent of about 2 degrees. By virtue of this construction, therefore, the mouth of the sleeve portion 43a is a little larger than the rear end thereof.

The so-formed slightly frusto-conical space within the confines of the relatively thin-walled sleeve portion 43a is adapted to receive an annular mold member 47 the outer surface of which also tapers from the front to the rear of the mold member to the extent of about 2 degrees, but in any case precisely at the same angle as the inner surface of the sleeve portion 43a. The inner surface of the mold member 47 is suitably contoured in accordance with the desired shaping of the outer surface of the tread band T to be formed. Although the mold member 47 may be a unitary sleeve-like structure, it is preferred in accordance with the present invention that it be axially split, i.e. composed of two radially separable halves which can be suitably joined together to form the desired sleeve-like mold member. At its front and rear ends, the mold member 47 is provided with inwardly directed flanges 47a and 47b the inner diameters of which are substantially equal to each other and to the outer diameter of the bearing ring 27, the outer diameter of the cylindrical member 23 and the outer diameter of the plate 20 at the junction thereof with the member 23. The sleeve 43 and mold member 47 are preferably provided with cooperating key and keyway means (not shown) to afford a positive rotational lock therebetween.

Confined between and welded to both the annular member 42 and another annular member 42', which is also mounted on the sleeve portion 43a but is welded thereto, is a gear ring 48. The teeth of the gear ring 48 mesh with the teeth of a gear 49 fixed to a shaft 50 journaled at its opposite ends in suitable bearings 51. The bearings 51 are arranged, respectively, in the upper arms of a pair of dual-arm clamping fixtures 52 which are mounted on and secured to two adjacent ones of the tie rods 40 by means of nuts and bolts 53. The teeth of the gear 49 further mesh with the teeth of a gear 54 keyed or otherwise secured to the shaft 55 of any suitable drive means 56, e.g. an electric motor and gear box arrangement. The drive means 56 are supported on a base 56' which is clamped, in essentially the same manner as the bearing structure of the gear 49, to two adjacent ones of the tie rods 40 rearwardly of the location of the gears 49 and 54.

Actuation of the drive means 56 thus causes the gears 54 and 49 to rotate the gear ring 48 and therewith the sleeve 43 to which the gear ring is fixed by the members 42 and 42'. The outer surfaces of bearing ring 35 and shoulder 45a of the bearing ring 45 which the sleeve 43 engages internally, and the inner surface 41a of bearing 41 all cooperate to permit this rotation of the sleeve. Axial displacement of the sleeve 43 relative to and within the cage structure 37 is prevented by the contact between the bearing ring 41 and the radial shoulder of the annular member 42 on the one hand, and by the contact between the rear end of the sleeve 43 and the radial shoulder of the bearing ring 45 on the other.

For the purpose of moving the cage structure 37 and the various instrumentalities secured thereto longitudinally of the stationary sleeve 24 and member 23, there are provided two double-acting hydraulic actuators 57 the cylinders 57a of which are rigidly supported by the base structure 11 and the piston rods 57b of which are bolted at their forwardmost ends to a pair of ears 38a of the front end plate 38. Upon admission of hydraulic fluid, with the aid of suitable control valves (not shown), into the cylinders 57a through the respective conduits 58, the piston rods 57b are retracted to bring the cage to the position illustrated in FIG. 1. Admission of hydraulic fluid into the cylinders 57a through the conduits 59 causes the piston rods 57b to be extended so as to move the entire cage structure to the position illustrated in FIG. 3.

In operation, when the cage structure 37 is in the retracted position thereof, the mold member 47 retained within the sleeve portion 43a is positioned in surrounding relationship to the member 23 so that a mold cavity having the cross-sectional shape of the desired tread band T is defined between the contoured inner surface of the outer mold member 47 and the cylindrical outer surface of the inner mold member 23. Especially in the case where the outer mold member 47 is split or composed of two halves joined together (see FIG. 7, for example) it is absolutely essential that when the inner and outer mold members are located in cooperative relationship to one another, the latter be gripped tightly and securely over its entire circumference so as to prevent any possibility of its halves being separated from one another during the extrusion of the stock S into the mold cavity. This, of course, requires that there be no clearance whatsoever between the outer surface of the outer mold member 47 and the inner surface of the surrounding sleeve portion 43a.

It is to achieve this end and at the same time to facilitate introduction of the outer mold member into the interior of the sleeve portion 43a that the inner surface of the latter and the outer surface of the former are complementarily tapered as hereinbefore described. Since the mouth of the sleeve portion 43a is larger than the rear end of the outer mold member, the latter can be easily inserted into the said sleeve portion, and the relative longitudinal or axial dimensions of these elements are so chosen that the mold member 47 becomes securely wedged in the sleeve portion 43a at a point which places the larger end of the said mold member approximately even with the front end of the surrounding sleeve portion. As clearly shown in FIG. 1, furthermore, the axial length of the mold member 47 is such that when the aforesaid relationship between the outer mold member and the sleeve portion has been attained, the front flange 47a of the outer mold member engages the front peripheral region of the inner mold member 23, while the rear flange 47b of the mold member engages the outer periphery of the ring 27.

It will be understood, therefore, that the tread stock S which is advanced through the barrel 17 by the screw 28 is, after having been compressed somewhat due to the gradually decreasing pitch of the extrusion screw flights 28a, extruded into the space between the fixed plates 19 and 20. Within this space the stock S passes outwardly about the spacers 22 and then again accumulates in the peripheral region of said space from which it is forced by the pressure of subsequently extruded stock into the mold cavity defined between the mold members 23 and 47 through the narrow annular passageway defined between the outer periphery of the plate 20 and the opposed portion of the inner surface of the outer mold member 47.

In accordance with the principles of the present invention, while this extrusion of the rubber stock into the mold cavity takes place, filling of the cavity in its entirety is facilitated greatly by virtue of the fact that the outer mold member 47 is continuously rotated at a predetermined angular speed by the drive means 56 acting through the transmission means constituted by the gears 54 and 49, the gear ring 48 and the sleeve portion 43a to which the gear ring is effectively fixed. Especially where the cylindrical outer surface of the inner mold member 23 is provided with a plurality of relatively shallow screw flights 23a winding thereabout from the rear toward the front of the said member, the screw flights exert an additional forward force on the stock then located in the mold cavity, which supplements the action of the extrusion pressure in advancing the stock. This makes it possible, therefore, to employ much lower extrusion pressures than have heretofore been required. As a result, the temperature rise in the extruded rubber stock during the filling of the mold cavity is considerably less than in the stocks processed by means of the known tread band and slab forming techniques, whereby the stock can be initially accelerated to a much greater extent than is conventionally practicable. This in turn leads to a corresponding reduction of the curing time required for the tread band in the ultimate formation and molding of the tire.

It is to be noted that although the screw flights 23a on the cylindrical outer surface of the inner mold member 23 are shown as relatively closely packed and deep, this has been done only for purposes of illustration of the operational principles involved in the present invention. Most preferably, the screw flights are, as previously indicated, relatively shallow. Flight depths of $\frac{1}{64}$ inch, 0.035 inch and $\frac{3}{16}$ inch have been found practical for a number of stocks, but it is clear that depths of as much as about $\frac{1}{2}$ inch or so may advantageously be employed, depending on the nature of the plastic material and on the operating conditions. Moreover, it is entirely feasible to achieve the results contemplated by the present invention with the aid of only a few turns of relatively large pitch, shallow screw flights. Under certain conditions, these screw flights may be constituted by a plurality of relatively widely spaced helical grooves each of which extends substantially over the entire length of, but only for a fraction of a complete turn about, the periphery of the inner mold member 23.

In actual experience with the formation of tire tread bands by means of the apparatus shown in FIGS. 1 to 3, it has been found that the outer mold member 47 remains firmly wedged in the surrounding sleeve portion 43a during the entire extrusion operation, even without the provision of any restraining means such as latches or bolts on the cage end plate 38 for engagement with the front end of the mold member 47. This is presumably due to the fluid pressure of the incoming stock S, which not only tends to force the outer mold member radially outwardly so as to enhance the frictional contact between the latter and the sleeve portion 43a, but also acts rearwardly axially of the outer mold member against the inwardly directed rear flange 47b of the latter, thus opposing the forwardly directed forces exerted on the outer mold member. Nevertheless, if desired, and also to provide an additional safety factor, suitable latching devices engageable with the front end of the outer mold member may be provided at the front face of the front end plate 38 of the cage structure 37, or on the front end of the sleeve portion 43a.

As soon as the extrusion operation is completed, which is evidenced by the appearance of a thin cylinder of flash penetrating through the small clearance between the inner mold member 23 and the front flange 47a of the outer mold member 47, the rotation of the extrusion screw 28 is stopped. The rotation of the outer mold member is, however, continued. With the extrusion screw deactuated, fluid pressure is applied to the cylinders 57a through the respective conduits 59 thereof to advance the piston rods 57b and thereby to move the cage structure 37 and the outer mold member gripped by the sleeve portion 43a to the position illustrated in FIG. 3. It will be readily understood that during the initial portion of this movement, the inner edge face of the rear flange 47b of the outer mold member 47 rides across the outer periphery of the plate 20 and thus serves to shear the portion of the stock in the mold cavity from the remainder of the stock disposed in the space between the plates 19 and 20. Moreover, during the entire movement of the cage, the still uninterrupted rotation of the sleeve 43 and therewith of the outer mold member 47 permits the tread band T, due to the presence of the screw flights 23a, to be moved easily along the outer surface of the inner mold member 23 with a substantial smearing action which serves to smooth the cylindrical inner face of the tread band. Thus, the separation of the mold members, like the extrusion operation, is characterized by a helical or rotational relative motion between the tread band and the inner mold member 23.

When the cage reaches the position of FIG. 3, the outer mold member is completely clear of the inner mold member, and the drive means 56 are then deactuated to interrupt the rotation of the mold member 47. This permits the outer mold member to be extracted from the sleeve portion 43a with the aid of any suitable manually or automatically operable tools or transfer mechanisms. If the mold member 47 is split, it may now be opened to liberate the tread band which can thereafter be used in the production of a pneumatic tire.

While this is taking place, an empty mold member 47 is inserted into the sleeve portion 43a, whereupon the hydraulic actuators 57 are reversed to retract the piston rods 57b and the cage structure 37 into the position illustrated in FIG. 1. Both the extrusion screw 28 and the drive means 56 are then again actuated for the next extrusion and tread band forming operation.

It is noted in passing that any tread band T formed with the aid of a longitudinally split, multi-section mold member 47 will, upon being removed from the latter, have a plurality of thin streaks of flash projecting from its sides, as indicated by reference character F in FIG. 7. Such flash is for all practical purpose unavoidable and appears at locations corresponding to the lines of juncture between the sections of the mold member 47. The amount of flash is, however, negligible in terms of the quantity of rubber making up the tread band T and will not interfere in any way with the subsequent curing of the tire.

The apparatus 10 illustrated in FIGS. 1, 2 and 3, as clearly shown, employs a rotatable sleeve 43 which extends over and rides along the entire length of the stationary sleeve 24 within which the extrusion barrel 17 and screw 28 are housed, and thus special bearings 35 and 45 must be provided which can not only accommodate the linear and rotational movements of the sleeve 43 and cage structure 37 but also effectively support the entire weight of the cage structure and the instrumentalities carried thereby. In accordance with the present invention, some of these factors may be eliminated through the use of the apparatus 10' shown in FIGS. 4, 5 and 6 which is a somewhat modified and simplified version of the apparatus 10. Those elements which are common to the two structures are, of course, identified by the same reference numerals.

Referring now more specifically to FIGS. 4, 5 and 6, the apparatus 10' includes the stationary sleeve 24, the member 23 having a cylindrical outer surface provided with screw flights 23a, the plates 19 and 20 associated with the members 24 and 23, respectively, and rigidly secured to one another by means of bolts 21 at opposite faces of spacers 22, the extrusion barrel 17 located within the confines of the sleeve 24, the extrusion screw 28 located within the barrel 17, the bushing 32 in the plate 20 surrounding the reversely pitched screw flights 28b on the front end of the extrusion screw shaft, and the bearing ring 27 surrounding the plate 19. Some of the minor elements associated with the foregoing (as shown in FIGS. 1 and 3) are either not illustrated or not specifically identified in FIG. 6.

As clearly shown in FIGS. 4 and 5, the sleeve 24 is received in and rigidly affixed to a base structure 11′ which includes an upper block 60 which is integral with a standard 61 disposed on the ground or floor of the building in which the apparatus is housed. The base structure further includes a lateral platform 63 supported on the floor 62. A motor 64, the drive shaft of which is connected via suitable gearing and transmission means (not shown) located within the standard 61 and block 60 to the extruder screw 28, is mounted on the platform 63. A pair of rails or tracks 65 are arranged on the floor 62 in front of the base structure 11′.

Disposed in front of the base structure 11′ is a framework 66 which comprises a base platform 67 and a pair of upright spaced standards 68 mounted at the front and rear ends of the platform 67 and provided with axially aligned openings 68a. Suitably arranged within the confines of the standards 68 at the said openings thereof are respective ball or roller bearings 69 the inner races of which have inner diameters slightly smaller than the diameters of the openings 68a and are secured to the outer periphery of a sleeve 70 extending between the standards 68 and through the openings 68a. The sleeve 70 is thus adapted to rotate freely relative to the standards 68. The inner surface of the sleeve 70 is tapered lengthwise of the sleeve to the extent of about 2 degrees in the same manner as the inner surface of the sleeve portion 43a described in connection with the apparatus 10 in FIGS. 1 to 3. Thus, the sleeve 70 constitutes the means by which the outer mold member 47 may be held in cooperative relationship to the inner mold member 23.

Secured to the outer periphery of the sleeve 70 intermediate the standards 68 is a bull gear ring 71 the teeth of which mesh with the teeth of a spur gear 72 fixed to a shaft 73 rotatably journaled in the lower regions of the standards 68. One end of the shaft 73 extends through the rear standards 68 and is connected in any suitable manner to the hub of a relatively large sprocket wheel 74 which is connected by means of a sprocket chain 75 to a relatively smaller sprocket wheel 76. The latter is carried by and fixed to the drive shaft 77 of a motor 78 the base of the frame of which is bolted to the standards 68 at one side of the latter. The entire framework 66 is mounted on wheels or rollers 79 connected with the platform 67 and adapted to ride along the tracks 65 toward and away from the base structure 11′, the maximum separation of the said frame work from the base structure being limited by chocks or abutment blocks 80 provided at the front ends of the rails 65. The rear standard 68 is further connected to a pair of piston rods 81a of a pair of double-acting hydraulic actuators 81 the cylinders 81b of which are rigidly secured to the opposite sides of the block 60.

It will be readily apparent that the actual extrusion and tread band forming operation as carried out by the apparatus 10′ is precisely the same as the operation carried out by the apparatus 10 of FIGS. 1 to 3. Thus, when pressure fluid is admitted into the cylinders 81b via the respective conduits 82 thereof to retract the piston rods 81a, the movable framework 66 is displaced into the position thereof illustrated in FIGS. 4 and 5, which locates the empty outer mold member 47 in surrounding and mold cavity-defining relationship to the stationary inner mold member 23. As before, the front flange 47a of the outer mold member is in engagement with the outer periphery of the inner mold member 23 at the front end region thereof, and the rear flange 47b of the outer mold member is in engagement with the outer periphery of the bearing ring 27 secured to the plate 19. With both the motor 64 and the motor 78 started, the tread stock S is extruded into the space between the plates 19 and 20 and thence into the mold cavity defined between the inner and outer mold members, while at the same time the outer mold member is rotated through the intermediary of the sleeve 70 in which it is securely wedged. Consequently, the stock within the mold cavity is aided in its advance along the outer surface of the inner mold member 23 due to the presence of the screw flights 23a. Here too it has been found that the outer mold member will remain wedged in the sleeve 70 without the use of any external latches or restraining means, but it will be understood that these may be provided if desired.

When the extrusion operation is completed and the mold cavity filled, as evidenced by the appearance of a thin cylinder of flash around the entire front end of the stationary mold member 23, the motor 64 is deenergized to stop the extrusion screw, but the motor 78 continues to rotate the sleeve 70 and outer mold member 47. Concurrently, pressure fluid is admitted into the cylinders 81b through the respective conduits 83 thereof to protract the piston rods 81a and move the framework 66 away from the base structure 11′ to the extent permitted by the chocks 80 and/or the stroke lengths of the actuators 81. Again, during the initial portion of this movement the inside face of the rear flange 47b of the outer mold members shears the stock constituting the tread band T in the mold cavity from the stock S in the space between the plates 19 and 20. As soon as the framework 66 comes to rest at the far end of the tracks 65, the motor 78 is deenergized to stop the rotation of the sleeve 70. The outer mold member now being completely clear of the inner mold member, the former can be removed from the sleeve 70 by any suitable manual or automatic means (as hereinbefore described in connection with FIGS. 1, 2 and 3) whereupon a fresh empty mold can be fitted into the sleeve 70 prior to the retraction of the framework 66 for the next extrusion and tread band forming operation.

One of the considerable advantages of this construction in accordance with the present invention is that the extrusion barrel 17 is fully supported over a major portion of its length by the base structure 11′ and that only the relatively short sleeve 24 and the attached inner mold member 23 extend freely into the space in front of the base structure. At the same time, the full weight of the framework 66 and of the mold member-supporting sleeve 70, the gearing or transmission means 71 to 76 and the motor 78 carried thereby is borne by the ground or floor beneath the apparatus. As a result, the bearings 69 which rotatably support the sleeve 70 can be relatively simple in nature as compared with the bearing rings 35 and 45 shown in FIGS. 1 and 3. Still further, the bearings 69 are completely isolated from the mold structure, so that the tread stock can never foul these bearings as it might the bearing rings 35 and 45 in the apparatus of FIGS. 1 to 3 if, for example, some of the stock were to escape rearwardly of the outer mold member past the bearing ring 27 and into the space between the sleeves 24 and 43.

It will be noted that in the apparatus 10 of FIGS. 1 to 3 as well as in the apparatus 10′ of FIGS. 4 to 6, the inner diameter of the extrusion barrel is relatively small compared to the inner diameter of the outer mold member 47. A modified construction of the apparatus according to the present invention is somewhat diagrammatically illustrated in FIG. 8.

As there shown, the apparatus 84 comprises an extrusion barrel 85 the wall of which is provided with one or more longitudinally extending bores 86 through which a suitable temperature control fluid may be circulated. The barrel 85 houses a large diameter extrusion screw 87 having extrusion screw flights 87a and a front extension 88 having a cylindrical outer surface. The outer diameter of the extension 88 is shown to be precisely the same as the effective outer diameter of the main body of the extrusion screw 87, but for the intended purposes of this form of the apparatus the diameter of the extension 88 may be either somewhat larger or somewhat smaller than the extrusion screw diameter. The latter should, however, approximate the average diameter of the tread band to be formed. The cylindrical outer surface of the member 88 is provided with screw flights 88a corresponding in nature and arrangement to the screw flights 23a described hereinbefore in connection with the apparatuses 10 and 10' of FIGS. 1 to 6. At the junction between the front end of the body of the extrusion screw 87 and the rear end of the extension 88, one or more internal bores 89 establish communication between the discharge end of the extrusion screw flights 87a and the space surrounding the outer surface of the extension 88.

In the illustrated form of the apparatus 84, a cage structure 90 is provided which comprises a first, essentially vertical frame member 91 having an annular peripheral flange 91a and a central opening 91b through which the barrel 85 extends freely, and a second, downwardly and forwardly slanted frame member 91c. An annular ring 92 is secured to the front edge of the flange 91a by bolts 92a and projects radially inwardly of the said flange. Secured to the frame member 91 by bolts 93a concentrically with the opening 91b is an annular bearing ring 93 which is slidably mounted on the barrel 85. A second annular bearing ring 94 is secured by bolts 94a to the outer periphery of the barrel 85 adjacent the front end of the latter.

Disposed in concentric and surrounding relationship to the extrusion barrel 85 and the extrusion screw structure 87–88 is a sleeve 95. The inner surface of the main body of the sleeve 95 slidably engages the outer surfaces of the bearing rings 93 and 94. At its rear end, the sleeve 95 is provided with a radially outwardly directed flange 95a which extends into the channel defined behind the ring 92. A thrust bearing 96 is interposed between the rear face of the flange 95a and the inner, front face of the frame member 91. As clearly shown in FIG. 8, the arrangement is such that, due to the close confinement of the flange 95a between the ring 92 and the thrust bearing 96, axial movement of the sleeve 95 relative to the cage structure 90 is effectively prevented.

The frontwardmost portion 95b of the sleeve 95 is provided with an inner surface which tapers rearwardly to the extent of about 2 degrees and thus is adapted to receive an annular mold member 97 the outer surface of which is also tapered in precisely the same manner, as described hereinabove in connection with the mold member 47 and sleeve portion 43a. The length of the mold member 97 is such that when it is positioned in cooperative relationship to the extension 88 of the extrusion screw 87 so as to define a tread band-shaped mold cavity between the outer surface of the extension 88 and the inner surface of the mold member 97, the front flange 97a of the outer mold member 97 engages the outer periphery of the front end region of the extension or inner mold member 88 while the rear flange 97b of the outer mold member engages the outer periphery of the inner mold member rearwardly of the discharge end or ends of the bores or ducts 89.

Rigidly affixed, as by welding, to the outer periphery of the sleeve portion 95b is a gear ring 98 the teeth of which mesh with the teeth of a spur gear 99. The gear 99 is keyed or otherwise connected to the drive shaft of a motor 100 the frame of which is supported by a platform 101 slidably mounted on a guide rail structure 102 extending parallel to the axis of the sleeve 95 between stationary base members 103. The frame member 91c of the cage structure 90 is connected to the platform 101 at the rear end of the latter. Positioned rearwardly of the cage frame member 91 are double-acting hydraulic actuators 104 the cylinders 104a of which are anchored to stationary base members 105 and the piston rods 104b of which are connected to the frame member 91.

In the operation of the apparatus according to this embodiment of the invention, when the double-acting hydraulic actuators 104 are operated to retract the cage structure 90 and therewith the sleeve 95 and outer mold member 97 into the positions thereof illustrated in FIG. 8, the drive means (not shown) connected to the extrusion screw 87 are actuated to rotate the latter, while at the same time the motor 100 is started to rotate the sleeve 95. Thus, the tread stock is extruded into the mold cavity through the bores 89 while the outer mold member is rotating. By way of distinction from the inner mold member 23 of the apparatuses 10 and 10' shown in FIGS. 1 to 6, however, the inner mold member 88 of the apparatus 84 shown in FIG. 8 also rotates. In the apparatus 84, therefore, the characteristics of the drive means for the extrusion screw and the mold member-supporting sleeve 95 must be such that a relative rotational motion between the inner and outer mold members is achieved, so as to permit the screw flights 88a to be effective in aiding the advance of the tread stock through the mold cavity.

As soon as the mold cavity is filled, the extrusion screw is stopped. This also brings the rotation of the inner mold member 88 to a halt, but since the sleeve 95 and therewith the outer mold member 97 are still rotating under the action of the motor 100 and the transmission means 99–98, the relative rotational motion between the tread stock in the mold cavity and the outer surface of the inner mold member is maintained as the hydraulic actuators 104 are operated to extend the piston rods 104b and thereby move the cage structure 90 forwardly over the extrusion barrel 85 until the outer mold member is completely clear of the inner mold member. As previously mentioned, the inner surface of the tread band is smoothed out during its movement with the outer mold member. At this point, the motor 100 is deenergized and the rotation of the mold member 97 interrupted, whereupon the latter may be extracted from the space within the sleeve portion 95b after the unlocking of latches 106 (only one of which is shown). It is to be understood, of course, that the provision of such latches is not absolutely necessary, as explained hereinbefore in connection with the apparatuses of FIGS. 1 to 6.

Thereafter, while the tread band just formed (which, except for size, will closely resemble the band T shown in FIG. 7) is removed from the mold member 97, another and empty mold member 97 is fitted into the sleeve portion 95b, and the hydraulic actuators 104 are then reversed to retract the cage structure 90 and the instrumentalities connected therewith back into the positions thereof illustrated in FIG. 8 for the next tread band extrusion operation. As in the case of the mold member 47, the mold member 97 may be longitudinally split or of unitary construction.

As will be readily apparent, the apparatuses 10, 10' and 84 so far described may be automated, i.e. associated with automatically operating clamps and transfer means for extracting the filled, band-containing, outer mold members from the respective movable sleeves and for inserting empty mold members into said sleeves. In all of these apparatuses, however, it is essential, for obvious reasons, to interrupt the rotation of the extrusion screw during the finite (though short) interval of time it takes to remove the filled mold member and to replace it by an empty one.

Referring now more particularly to FIG. 9, the tread band forming apparatus 107 there shown is characterized, in accordance with still another embodiment of the present invention, by an arrangement of structural features which permits the extrusion operation to be continued uninterruptedly during the removal of filled, tread band-containing mold members sequentially as they become filled. To this end, the apparatus 107 comprises a base structure 108 which includes a frontwardly extending platform 109 and an upright leg structure 110 at the front end of the platform. Secured in any desired manner to the base structure 108 near the top thereof and extending frontwardly therefrom is an extrusion barrel 111. The wall thickness of the barrel 111 is substantially uniform over the entire length of the barrel, between a cylindrical outer surface 112 and a cylindrical inner surface 113, but adjacent the front end 111a of the barrel the inner surface of the latter increases in diameter, as shown at 113a. Adjacent its rear end the barrel 111 is provided with an intake opening 114 through which the rubber tread stock S may be fed into the barrel.

Rotatably disposed concentrically within the barrel 111 is an extrusion screw 115 having three sections 115a, 115b and 115c. The first screw section 115a is substantially cylindrical in shape, is located within the major portion of the barrel 111 and has an external diameter precisely mated to the diameter of the inner barrel surface 113. The second screw section 115b is frusto-conical in shape, and its flaring or expanding outer diameter is precisely mated to the diameter of the diverging portion 113a of the inner surface of the barrel. The third screw section 115c is almost cylindrical in shape, having an outer diameter which at the junction of the screw sections 115b and 115c is slightly less than the outer diameter of the barrel 111 and gradually increases until at the front end of the screw section 115c it is precisely equal to the outer diameter of the barrel.

At its front end, the extrusion screw 115 is provided with an axial extension 116 which has a substantially cylindrical outer surface equal in diameter to the outer barrel surface 112 and on which are provided relatively shallow screw flights 116a corresponding in terms of their arrangement and dimensional characteristics to the screw flights 23a and 88a described hereinbefore in connection with the inner mold members of the apparatus embodiments illustrated in FIGS. 1 to 6 and 8. The front end region 111a of the barrel 111, the second screw section 115b, the third screw section 115c and the extension 116 are surrounded by and extend axially through a stationary sleeve structure 117 rigidly supported by the leg structure 110 and having a precisely cylindrical inner surface 117a.

Although it is not expressly illustrated in FIG. 9, the extrusion screw 115 is adapted to be rotated by means of a motor 118 mounted on the base structure 108 and drivingly connected to the shaft 119 of the screw via suitable gearing or other transmission means (not shown) housed within the base structure 108. Running lengthwise through the body of the extrusion screw 115 essentially up to the front end of the extension 116 are suitable ducts 120 and 121 through which a fluid temperature control medium may be circulated as indicated by the small arrows.

As shown in FIG. 9, the apparatus 107 employs outer mold members 122 each of which is longitudinally or axially split and, by way of distinction from the outer mold members 47 and 97 of the previously described embodiments of the apparatus, constructed to have, when its sections are joined together, a precisely cylindrical outer surface with a diameter substantially equal to the diameter of the inner surface 117a of the sleeve structure 117. Each outer mold member 122 is provided with radially inwardly directed front and rear flanges 122a and 122b, and the diameter of the inner face of each such flange is substantially equal to the diameter of the outer surface 112 of the barrel 111 and thus also to the diameter of the outer surface of the extension 116. The mold members 122 are thus adapted, when their sections are joined together, to be mounted on the extrusion barrel 111 in surrounding relationship thereto with a close sliding fit, and to be telescoped into the sleeve structure 117 with a likewise close sliding fit.

It will be understood that the structure of this apparatus as used in actual practice will vary somewhat from that which is illustrated only diagrammatically in FIG. 9. Thus, circumferentially spaced linear ball bearings means will generally be used to define the inner surface 117a of the sleeve structure 117 contacted by the outer surfaces of the outer mold members 122, and backup sectors may even be provided to be interposed between the outer surfaces of the outer mold members and the aforesaid bearing-defined inner sleeve surface. Also, the extension 116 of the screw 115, rather than being only one mold long, will generally be two or three molds long.

For the purpose of describing the operation of the apparatus according to this embodiment of the present invention, it will be assumed that a new run is just about to be begun. At the start, therefore, several empty outer mold members 122z, 122y, 122x, 122w, 122v and 122t are fitted over and onto the extrusion barrel 111 in succession approximately from the center of the latter, the manner of mounting being indicated in phantom outline for the mold member 122t. By means of any suitable linear indexing mechanism, e.g. a double-acting pneumatic or hydraulic actuator 123 having a cylinder rigidly supported by the base structure 108 and a piston rod carrying a catch arm or lug 124, the first such assembled outer mold member is advanced for one stroke length of the motor 123 along the extrusion barrel 111 to permit the next outer mold member to be placed onto the barrel, and so on, until the front flange 122a of the leading outer mold member reaches the front end of the extension 116.

The motor 118 is now started up to rotate the screw and cause the stock S to be advanced through the barrel 111 into the cavities defined between the outer surface of the screw section 115c and those of the contoured inner surfaces of the outer mold members which are juxtaposed to the outer surface of the screw section 115c. The latter thus functions as the inner mold member, and its screw flights aid the tread stock advance through the mold cavities. In the illustrative set-up of FIG. 9, it can be seen that only the three outer mold members 122y, 122x and 122w have their inner surfaces juxtaposed fully or partially to the third screw section 115c. At this time, of course, the first outer mold member 122z which surrounds the extension 116 is still empty. As the rotation of the screw 115 continues, therefore, the tread stock S is forced principally into the mold cavities defined within the mold members 122y and 122x. However, due to the plasticity of the stock being advanced by the middle screw section 115b, a small amount thereof will flow around the front edge of the extrusion barrel 111 and backardly into the mold cavity defined within the mold member 122w. This is obviously not disadvantageous since that cavity will eventually be filled anyway.

As soon as the mold cavity in the mold member 122y is completely filled, suitable non-synchronous controls (not shown) set in accordance with the physical characteristics of the tread stock S, the pitch characteristics and rate of rotation of the extrusion screw 115, and the sizes of the mold cavities to be filled, and operatively connected with the actuator 123, operate the latter to advance the catch arm 124 and push the last empty outer mold member 122t forwardly along the barrel 111 toward the mold-retaining sleeve structure 117. This advances each of the other outer mold members axially. The first and still empty outer mold member 122z is thus ejected from the front end of the sleeve structure 117 and may then be transferred manually or automatically back toward the inserting station at which it may be opened and fitted about and remounted on the extrusion barrel 111. To assure linear and non-rotating movement of the various outer mold members through the sleeve structure 117, the mold members are preferably keyed to the sleeve structure in any desired manner (not shown).

While this is taking place, the extrusion screw 115 continues to rotate and thus completes the filling of the second mold cavity defined within the mold member 122x with tread stock. When the aforesaid non-synchronous controls again operate the actuator 123, the catch arm 124 (which was previously retracted by an automatic reversal of the actuator 123) is again advanced to push the now last mounted outer mold member 122z, forwardly along the barrel 111, thereby again axially advancing all of the other outer mold members positioned within the confines of the sleeve structure 117. The now foremost outer mold member 122y which is filled with the first formed tread band is thereby ejected from the sleeve structure 117. This ejection movement is greatly facilitated by the shallow screw flights 116a on the extension 116 which create a relative motion having a forward component between the outer surface of the inner mold member and the inner surface of the tread band. The ejected and filled outer mold member 122y is immediately received by any suitable, preferably automatic transfer mechanism 125 which transports the said mold member to the band-extraction station. The mold member 122y when empty is then either manually or automatically returned to the inserting station at which it is to be opened and remounted on the barrel 111.

The present invention as embodied in any of the forms of the processes and apparatuses described herein leads to a number of operating advantages in addition to those previously referred to. Thus, by virtue of the fact that both during the extrusion operation, i.e. the filling of each mold cavity, and during the separation of each filled outer mold member from the inner mold member, there is provided a relative motion between the inner surface of the tread band and the outer surface of the inner mold member, which motion has both rotary and axial components, lower extrusion pressures can be employed, with the result that the temperature of the stock rises less than in conventional tread band extruding apparatuses. The stock as initially compounded thus can be more highly accelerated than is presently the practice in the tire building art without fear of premature curing, whereby further the ultimate curing period for each tire in the tire press can be correspondingly reduced, permitting greater production capacities and economies to be attained. In this connection, it is pointed out that a suitable temperature controlling fluid may be circulated through the screw and inner mold member of each of the apparatuses 10, 10' and 84 in a manner similar to that illustrated for the screw of the apparatus 107 in FIG. 9. Still further, any tread band produced by means of a process and apparatus according to this invention can be applied to a waiting tire carcass while still hot, which not only eliminates the need for extensive storage and cooling facilities for the tread bands but also tends to lower the number of defective tires produced inasmuch as the stitching of the carcasses to the hot tread band substantially reduces the possibility of air being trapped therebetween.

It will be understood that the apparatuses and processes according to the present invention can be employed in the production of annular articles other than pneumatic tire tread bands. The only condition to be observed is that the inner surface of such an article must be substantially cylindrical, and thus the inner mold member likewise must have a substantially cylindrical outer surface. As previously indicated, for the production of any article, the type, dimensions and arrangement of the screw flights on the extrusion screw and on the inner mold member will depend on the nature and physical properties of the plastic material being extruded and shaped. In no case, however, is any lubrication of the mold cavity surfaces required.

It will be clear to those skilled in the art that an apparatus such as any of the foregoing forms of the invention will be subjected to considerable torques during each extrusion operation. Although it is not explicitly illustrated, suitable torque-opposing means may be provided. Merely by way of example, in the case of the apparatus 10' of FIGS. 4, 5 and 6 such torque-opposing means may comprise an auxiliary and rigidly mounted rail extending parallel to one of the rails 65 but engaging the associated wheels 79 from above. Other arrangements for each of the apparatuses 10, 10', 84 and 107 will readily suggest themselves.

It will be understood that although the embodiments of this invention described above and depicted in the accompanying figures are preferred embodiments of the invention, it is also possible to introduce the plastic material intermediate the axial extremities of the molding cavity and to then permit it to flow axially in both directions to fill the molding cavity.

Similarly, it would not violate the spirit and scope of this invention to provide an inner mold member having a smooth cylindrical exterior surface with no helical screw flights thereon.

It will also be understood that although the actual rate of relative rotation between the members of the pair of mold members will depend upon such factors as the size of the mold, the properties of the particular plastic material being handled and the nature of the finish required, such rotation will generally be of such a rate as to provide a relative linear velocity of 2 to 100 feet per minute between mold members.

It is to be noted that the terms "rubber" and "plastic material" are employed interchangeably in this application, and that they are intended to embrace both natural and synthetic rubber and rubbery compositions, as well as a variety of synthetic plastic materials which are susceptible to being extruded for molding operations.

While there have been described herein preferred embodiments of the apparatus and process according to the present invention, it will be understood that a number of changes and modifications may be made in the structural characteristics of the apparatus, as well as in the operational steps and ambient operating conditions of the process, none of which changes involves any departure from the spirit and scope of the present invention as defined in the hereto appended claims.

Having thus described our invention, what we claim and desire to secure by Letters Patent is:

1. The process of forming a spliceless annular article of plastic material of rubber-like characteristics, comprising the steps of introducing said material into an annular mold cavity, advancing said material axially through said cavity to fill said cavity while maintaining a fixed axial relation between the inner and outer boundaries of said cavity during the entire advance of said material through said cavity, maintaining a relative rotational motion between said material and said inner boundary of said cavity during the entire advance of said material through said cavity to aid the filling of said cavity, and providing relative axial displacement between the formed article and said inner boundary of said cavity with the article seated along the outer boundary of said cavity while maintaining a relative rotational motion between the inner surface of said article and said inner boundary of said cavity until said article is completely clear of said inner boundary of said cavity.

2. The process of forming a spliceless annular article of plastic material of rubber-like characteristics, comprising the steps of introducing said material into an annular mold cavity, advancing said material axially through said cavity to fill said cavity, while maintaining a fixed axial relation between the inner and outer boundaries of said cavity during the entire advance of said material through said cavity, maintaining a helical relative motion between said material and the inner boundary of said cavity during the entire advance of said material through said cavity to aid the filling of said cavity, and thereafter axially displacing the formed article along said inner boundary of said cavity with the article seated along the outer boundary of said cavity while maintaining a rotational relative motion between the inner surface of said article and said inner boundary of said cavity until said article is completely clear of said inner boundary of said cavity.

3. The process of forming an annular article of plastic material having rubber-like characteristics, comprising the steps of defining an annular mold cavity, having substantially the desired cross-sectional shape of said article, between an inner mold member and an outer mold member surrounding said inner mold member in coaxial and spaced relationship thereto, introducing said material into said cavity at one axial extremity of the latter and substantially simultaneously around the entire circumference of said one extremity of said cavity, advancing said material through said cavity from said one axial extremity of the latter to the other while maintaining a fixed axial relation between the inner and outer boundaries of said cavity during the entire advance of said material through said cavity, effecting a relative rotation between said inner and outer mold members during the entire advance of said material through said cavity to aid the filling of said cavity, and thereafter axially displacing said outer mold member, and therewith the annular article formed in said cavity, along said inner mold member while maintaining a state of relative rotation between said inner and outer mold members until said article is completely clear of said inner mold member.

4. The process of forming an annular article of plastic material having rubber-like characteristics and having a substantially cylindrical inner surface, comprising the steps of defining an annular mold cavity between an inner mold member having a substantially cylindrical outer surface and an outer mold member surrounding said inner mold member in coaxial and spaced relationship thereto, introducing said material into said cavity at one axial extremity of the latter and substantially simultaneously around the entire circumference of said one extremity of said cavity, advancing said material through said cavity from said one axial extremity of the latter to the other while maintaining a fixed axial relation between the inner and outer boundaries of said cavity during the entire advance of said material through said cavity, effecting a relative rotation between said inner and outer mold members during the entire advance of said material through said cavity to aid the filling of said cavity, and thereafter axially displacing said outer mold member, and therewith the annular article formed in said cavity, along said inner mold member while maintaining a state of relative rotation between said inner and outer mold members until the cylindrical inner surface of said article is completely clear of the cylindrical outer surface of said inner mold member.

5. The process of forming a spliceless tread band having a substantially cylindrical inner surface from rubber stock, comprising the steps of positioning an inner mold member having a substantially cylindrical outer surface coaxially within an annular outer mold member having an inner surface contoured in accordance with the desired outer surface contours of the tread band to define between said mold members an annular mold cavity having substantially the desired transverse cross-sectional shape of the tread band, extruding said rubber stock into said cavity substantially simultaneously around the entire circumference of one axial extremity of said cavity so as to advance said rubber stock through said cavity from said one axial extremity of the latter to the other while maintaining a fixed axial relation between the inner and outer boundaries of said cavity during the entire advance of said material through said cavity, effecting a relative rotation between said inner and outer mold members during the entire advance of said rubber stock through said cavity until the latter is filled to aid the filling of said cavity, and thereafter axially displacing said outer mold member, and therewith the tread band formed in said cavity, along said inner mold member while maintaining a state of relative rotation between said inner and outer mold members until the cylindrical inner surface of the tread band is completely clear of said cylindrical outer surface of said inner mold member.

6. Apparatus for forming a spliceless annular article having rubber-like characteristics and having a substantially cylindrical inner surface from plastic material, comprising a pair of concentric mold members defining between the inner surface of the outer mold member and the outer surface of the inner mold member an annular mold cavity, said outer surface of said inner mold member being substantially cylindrical, means for extruding said material into said cavity and for advancing said material axially through said cavity to fill said cavity while maintaining a fixed axial relation between the inner and outer boundaries of said cavity during the entire advance of said material through said cavity, means for axially displacing one of said mold members relative to the other of said mold members with the article seated in said outer mold member to separate said mold members, and means for effecting a relative rotation between said inner and outer mold members during the entire advance of said material through said cavity and during the axial displacement of said one mold member relative to said other mold member, said extruding means being effective to extrude material into one axial extremity of said cavity, and said inner mold member being provided with relatively shallow helical screw flights in said outer surface thereof, said helical screw flights in said outer surface of said inner mold member further aiding the movement of the finished annular article relative to said inner mold member upon relative separation of the latter and said outer mold member.

7. Apparatus according to claim 6, said inner mold member being rigidly secured in a stationary position, said means for axially displacing said one mold member relative to said other mold member comprising a supporting structure arranged for movement axially of said inner mold member, means carried by said supporting structure for linear movement therewith and rotatable about the axis of said inner mold member for retaining said outer mold member, and power means operatively connected to said supporting structure for reciprocating the same axially of said inner mold member so as to locate said outer mold member in surrounding relationship to said inner mold member in one position of said supporting structure and so as to locate said outer mold member in axial separation from said inner mold member in another position of said supporting structure, said relative rotation effecting means comprising a drive motor carried by said supporting structure, and transmission means operatively interconnecting said drive motor and said rotatable outer mold member-retaining means, whereby the relative rotation between said inner and outer mold members is continued regardless of whether said outer mold member is axially stationary or in motion relative to said inner mold member.

8. Apparatus for forming spliceless annular tread bands from rubber stock, comprising extruder means including an extrusion screw and a surrounding extrusion barrel, first drive means connected with said extrusion screw for rotating the same, an inner mold member having a substantially cylindrical outer surface, said inner mold member being rigidly secured coaxially to said extrusion screw exteriorly of said extrusion barrel, a supporting structure mounted for reciprocal linear movement along said extrusion barrel and axially of said inner mold member, a retaining sleeve carried by said supporting structure for linear movement therewith and rotatable about the axis of said inner mold member, an annular outer mold member having its inner surface contoured in accordance with the desired cross-sectional shape of the tread bands to be formed, said retaining sleeve being constructed to grip said outer mold member for movement therewith so as to locate said outer mold member in surrounding and mold cavity-defining relationship to said inner mold member in one position of said supporting structure during filling of the mold cavity and so as to locate said outer mold member in axial separation from said inner mold member in another position of said supporting structure after said mold cavity has been filled, power means operatively connected to said supporting structure for reciprocating the same axially of said inner mold member, second drive means carried by said supporting structure, and transmission means operatively interconnecting said second drive means with said retaining sleeve for maintaining relative rotation between said inner and outer mold members both during the operation of said extrusion screw to extrude rubber stock into said mold cavity and during the axial separation of said outer mold member from said inner member, said extruder screw being effective to extrude material into one axial extremity of said cavity, and said inner mold member being provided with relatively shallow helical screw flights in said outer surface thereof, said helical screw flights in said outer surface of said inner mold member further aiding the movement of the finished annular tread band relative to said inner mold member upon relative separation of the latter and said outer mold member.

References Cited by the Examiner
UNITED STATES PATENTS

| | | |
|---|---|---|
| 1,895,740 | 1/1933 | Ukropina _____ 264—313 XR |
| 2,115,607 | 4/1938 | Becker _____ 264—328 XR |
| 2,372,177 | 3/1945 | Conner _____ 264—311 |
| 2,614,056 | 10/1952 | Kraft _____ 264—315 |
| 2,710,425 | 6/1955 | Rhodes _____ 264—326 |
| 2,724,424 | 11/1955 | Ostling _____ 264—328 XR |
| 2,801,441 | 8/1957 | Wadsworth. |
| 2,963,743 | 12/1960 | Kraft. |

ROBERT F. WHITE, *Primary Examiner.*

ALEXANDER H. BRODMERKEL, J. R. DUNCAN, S. A. HELLER, *Examiners.*